(12) United States Patent
Tanimichi et al.

(10) Patent No.: US 10,518,783 B2
(45) Date of Patent: Dec. 31, 2019

(54) AUTOMATIC DRIVING CONTROL DEVICE

(71) Applicant: Hitachi Automotive Systems, Ltd., Hitachinaka-shi, Ibaraki (JP)

(72) Inventors: Taisetsu Tanimichi, Hitachinaka (JP); Kunihiko Ohnuma, Hitachinaka (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 10 days.

(21) Appl. No.: 15/555,034

(22) PCT Filed: Mar. 4, 2016

(86) PCT No.: PCT/JP2016/056696
§ 371 (c)(1),
(2) Date: Aug. 31, 2017

(87) PCT Pub. No.: WO2016/158197
PCT Pub. Date: Oct. 6, 2016

(65) Prior Publication Data
US 2018/0050702 A1 Feb. 22, 2018

(30) Foreign Application Priority Data
Mar. 31, 2015 (JP) .................. 2015-070616

(51) Int. Cl.
*B60W 40/00* (2006.01)
*B60W 40/09* (2012.01)
(Continued)

(52) U.S. Cl.
CPC .......... *B60W 40/09* (2013.01); *B60W 30/00* (2013.01); *G01C 21/26* (2013.01); *G08G 1/16* (2013.01); *G05D 1/02* (2013.01)

(58) Field of Classification Search
None
See application file for complete search history.

(56) References Cited

U.S. PATENT DOCUMENTS

| 7,974,748 B2* | 7/2011 | Goerick | B60K 28/165 |
| | | | 701/28 |
| 9,308,914 B1* | 4/2016 | Sun | B60K 28/06 |
| | | (Continued) | |

FOREIGN PATENT DOCUMENTS

| DE | 10 2013 205 840 A1 | 10/2014 |
| JP | H05-004544 A | 1/1993 |
| | (Continued) | |

OTHER PUBLICATIONS

Japanese Office Action and machine translation thereof issued in corresponding application No. 2017-509441 dated Aug. 21, 2018.
(Continued)

*Primary Examiner* — Jonathan M Dager
(74) *Attorney, Agent, or Firm* — Foley & Lardner LLP

(57) ABSTRACT

Control can be continued so that control of automatic driving is not canceled even in a non-average specific road environment. An automatic driving control device, which controls an actuator of a vehicle in order to automatically travel on a road without driver operation through the use of an external surrounding recognition sensor for recognizing external surroundings and information from the external surrounding recognition sensor, has a learning recording device for recording external surrounding recognition information and vehicle status information when the driver is driving, an output comparison device for comparing the information recorded in the learning recording device with the processing results when the information recorded in the recording device is processed by the automatic driving control device, and a control parameter setting device for setting control parameters so that the results compared by the output comparison device approach the driving of the driver.

4 Claims, 11 Drawing Sheets

(51) Int. Cl.
  *G01C 21/26* (2006.01)
  *G08G 1/16* (2006.01)
  *B60W 30/00* (2006.01)
  *G05D 1/02* (2006.01)

(56) References Cited

U.S. PATENT DOCUMENTS

| | | | | |
|---|---|---|---|---|
| 9,610,949 | B2* | 4/2017 | Healey | B60W 30/12 |
| 9,619,638 | B2* | 4/2017 | Dow | B60R 16/037 |
| 9,766,625 | B2* | 9/2017 | Boroditsky | H04L 67/306 |
| 9,950,708 | B1* | 4/2018 | Cullinane | B60W 30/095 |
| 10,002,531 | B2* | 6/2018 | Lynch | G08G 1/0129 |
| 10,037,699 | B1* | 7/2018 | Toyoda | G06T 19/006 |
| 10,053,093 | B2* | 8/2018 | Thomas | B60W 30/14 |
| 10,077,056 | B1* | 9/2018 | Fields | B60W 40/09 |
| 10,146,224 | B2* | 12/2018 | Tafti | G05D 1/0005 |
| 2003/0093210 | A1* | 5/2003 | Kondo | B60G 17/0195 701/96 |
| 2008/0243312 | A1* | 10/2008 | Nakamura | G01C 21/26 701/1 |
| 2009/0234552 | A1* | 9/2009 | Takeda | B60W 30/16 701/96 |
| 2010/0241303 | A1* | 9/2010 | Taguchi | B60T 8/1755 701/31.4 |
| 2012/0083960 | A1* | 4/2012 | Zhu | G05D 1/0214 701/23 |
| 2012/0083964 | A1* | 4/2012 | Montemerlo | G05D 1/0214 701/26 |
| 2012/0277947 | A1* | 11/2012 | Boehringer | B60W 30/17 701/23 |
| 2013/0304334 | A1* | 11/2013 | Fuehrer | G07C 5/008 701/51 |
| 2014/0371981 | A1* | 12/2014 | Nordbruch | G07C 5/0841 701/36 |
| 2015/0073620 | A1* | 3/2015 | Matsumura | B60W 30/143 701/1 |
| 2015/0149017 | A1* | 5/2015 | Attard | B60W 30/182 701/23 |
| 2015/0166062 | A1* | 6/2015 | Johnson | B60W 30/12 701/41 |
| 2015/0266455 | A1* | 9/2015 | Wilson | G09B 19/10 701/93 |
| 2015/0294422 | A1* | 10/2015 | Carver | G06Q 40/08 705/4 |
| 2015/0308837 | A1* | 10/2015 | Cudak | G05D 1/0278 701/23 |
| 2015/0309512 | A1* | 10/2015 | Cudak | G05D 1/0287 701/23 |
| 2016/0325753 | A1* | 11/2016 | Stein | B60W 40/06 |
| 2016/0357188 | A1* | 12/2016 | Ansari | G05D 1/0212 |
| 2016/0357262 | A1* | 12/2016 | Ansari | G06F 3/017 |
| 2016/0358477 | A1* | 12/2016 | Ansari | G08G 1/167 |
| 2017/0174129 | A1* | 6/2017 | Chin | G01C 21/3647 |
| 2017/0225677 | A1* | 8/2017 | Yoshida | A61B 5/0476 |
| 2017/0282930 | A1* | 10/2017 | Kochhar | B60W 40/09 |
| 2017/0297586 | A1* | 10/2017 | Li | G05D 1/0088 |
| 2017/0305434 | A1* | 10/2017 | Ratnasingam | B60W 40/09 |
| 2017/0369073 | A1* | 12/2017 | Huber | B60W 50/0098 |
| 2018/0032082 | A1* | 2/2018 | Shalev-Shwartz | B60W 30/0953 |
| 2018/0061237 | A1* | 3/2018 | Erickson | G08G 1/163 |
| 2018/0074493 | A1* | 3/2018 | Prokhorov | G06N 3/0454 |
| 2018/0074497 | A1* | 3/2018 | Tsuji | G06K 9/00288 |
| 2018/0089563 | A1* | 3/2018 | Redding | G06N 3/08 |
| 2018/0143639 | A1* | 5/2018 | Singhal | B62D 15/00 |
| 2018/0170392 | A1* | 6/2018 | Yang | B60W 40/09 |
| 2018/0194280 | A1* | 7/2018 | Shibata | B60Q 9/00 |
| 2018/0203443 | A1* | 7/2018 | Newman | G01C 21/3691 |
| 2018/0253963 | A1* | 9/2018 | Coelho de Azevedo | B60W 40/09 |
| 2018/0259956 | A1* | 9/2018 | Kawamoto | B60W 40/09 |
| 2018/0267558 | A1* | 9/2018 | Tiwari | G05D 1/0246 |
| 2018/0281812 | A1* | 10/2018 | Tochioka | B60W 40/09 |
| 2018/0284774 | A1* | 10/2018 | Kawamoto | B60W 50/10 |
| 2018/0292222 | A1* | 10/2018 | Lin | G01S 17/936 |
| 2018/0292830 | A1* | 10/2018 | Kazemi | G01C 21/3453 |
| 2018/0307228 | A1* | 10/2018 | Smith | B60W 30/00 |
| 2018/0322715 | A1* | 11/2018 | Toyoda | G06T 19/006 |
| 2018/0328750 | A1* | 11/2018 | Yun | G01C 21/3415 |
| 2018/0336424 | A1* | 11/2018 | Jang | B60W 30/00 |
| 2018/0339709 | A1* | 11/2018 | Tiwari | G08G 1/0112 |
| 2018/0345981 | A1* | 12/2018 | Ferguson | B60W 40/09 |
| 2018/0346021 | A1* | 12/2018 | Wang | B62D 6/008 |
| 2018/0348763 | A1* | 12/2018 | Jiang | G05D 1/0088 |
| 2018/0349802 | A1* | 12/2018 | Jiang | G05D 1/0291 |

FOREIGN PATENT DOCUMENTS

| | | |
|---|---|---|
| JP | H07-108849 A | 4/1995 |
| JP | 2003-211999 A | 7/2003 |
| JP | 2005-092285 A | 4/2005 |
| JP | 2006-282073 A | 10/2006 |
| JP | 2007-176396 A | 7/2007 |
| JP | 2008-180591 A | 8/2008 |
| JP | 2009-137410 A | 6/2009 |
| WO | WO-2009/057701 A1 | 5/2009 |

OTHER PUBLICATIONS

Japanese Office Action and machine translation thereof issued in corresponding application No. 2017-509441 dated May 15, 2018.
International Search Report with English translation and Written Opinion issued in corresponding application No. PCT/JP2016/056696 dated Jun. 7, 2016.
Extended European Search Report dated Oct. 30, 2018 in Application No. 16772081.2.

* cited by examiner

AUTOMATIC DRIVING CONTROL DEVICE

TECHNICAL FIELD

The present invention relates to an automatic driving control device, and especially relates to setting control parameters.

BACKGROUND ART

PTL 1 describes an exemplary method for setting parameters of an automatic driving control device. For example the control device learns the parameters for controlling lane changes. The control device compares the frequency of lane changes on the market with the frequency of lane changes made while a driver manually drives a vehicle, and learns the comparison in order to bring the parameters close to the frequency of the driver's lane changes.

An automatic driving control device described in PTL 2 compares a feature value generated from a model driver in the automatic driving control device such as vehicle speed, a vehicle-to-vehicle distance, or the manipulated variable of the gas pedal with the feature value generated while the driver drives the vehicle and learns the comparison to optimize the parameter of the model driver in order to maximize the probability of agreement between the feature value of the model driver and the feature value of the driving of the driver.

CITATION LIST

Patent Literature

PTL 1: JP 2008-180591 A
PTL 2: JP 2007-176396 A

SUMMARY OF INVENTION

Technical Problem

However, it may be impossible for the automatic driving control devices in PTL 1 and PTL 2 to respond to each individual road environment although the automatic driving control devices perform control so that a feature value such as the frequency of lane changes, the vehicle speed, the vehicle-to-vehicle distance, or the manipulated variable of the gas pedal when the driver manually drives the vehicle in a certain interval agrees with the feature value when the driving is automated.

For example, when the driver commutes by car, the road environment changes between the alley in front of the driver's house, a main road in a city area, a highway between cities, a main road in an industrial area, and an alley near the factory.

If the parameters are adjusted based on the average values or precisions of the feature value, or the parameters are adjusted so that the precision of the feature value is agreed with such a road environment, the vehicle is properly controlled on the highway between cities with the longest travel distance. On the other hand, the vehicle is not properly controlled or the driver feels discomfort on the other roads of the road environment.

Especially, when the vehicle is not properly controlled while the driving is automated, it is necessary to cancel the control. For example, there are some places in which the control is canceled during the commute. This means that it may be impossible to use automatic driving on a daily basis. This spoils the value of the automatic driving device.

An objective of the present invention is to continue control so that control of automatic driving is not canceled even in a non-average specific road environment.

Solution to Problem

An automatic driving control device according to the present invention is, for example, an automatic driving control device that controls an actuator of a vehicle in order to cause the vehicle to automatically travel according to an external surrounding recognition sensor that recognizes external surroundings and information from the external surrounding recognition sensor without driver operation, and the automatic driving control device includes: a learning recording device that records external surrounding recognition information and vehicle condition information when the driver drives the vehicle; an output comparison device that compares a result of a process in which the automatic driving control device processes the information recorded in the recording device with the information recorded in the learning recording device; and a control parameter setting device that sets a control parameter so that the result compared by the output comparison device approaches driving of the driver.

Advantageous Effects of Invention

According to the invention, control can be continued so that control of automatic driving is not canceled even in a non-average specific road environment.

DESCRIPTION OF EMBODIMENTS

Figure 1:
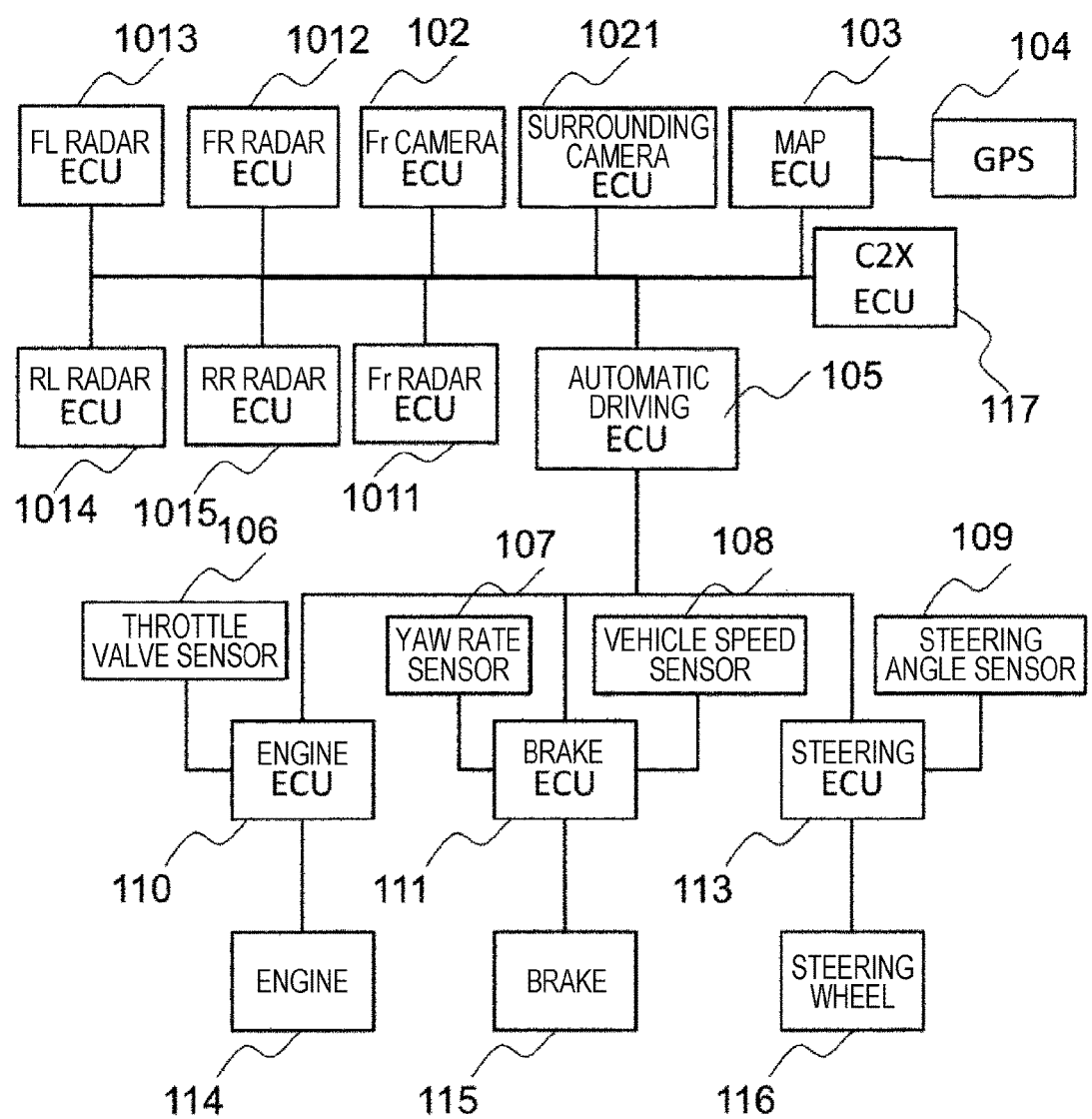
FIG. 1 is a block diagram illustrating an embodiment of the present invention.

The whole configuration of a control device according to the present invention will be described with referent to FIG. 1. An automatic driving ECU 105 obtains the information about the road environment around the driver's vehicle from an external surrounding recognition sensor to be described below.

Figure 11:
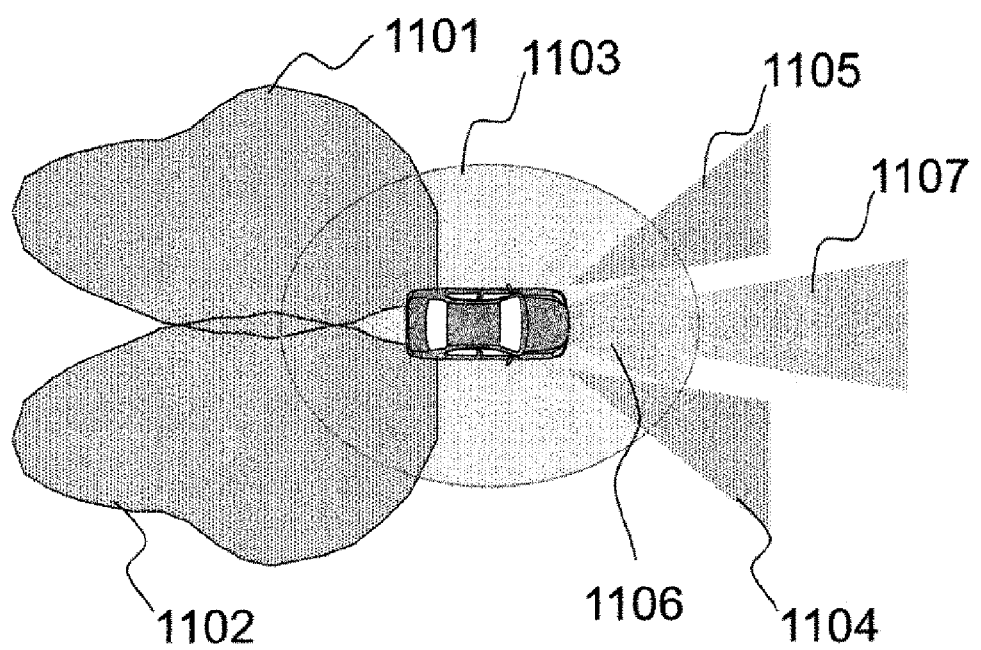
FIG. 11 is a diagram of ranges that an external surrounding recognition sensor recognizes.

The external surrounding recognition sensor includes a front radar 1011, a right front radar 1012, a left front radar 1013, a right rear radar 1015, a left rear radar 1014, a front camera 102, and a surrounding camera 1021. The sensing range of each of the radars and cameras is illustrated in FIG. 11. The sensing range of the front radar 1011 is indicated with 1107. The sensing range of the right front radar 1012 is indicated with 1105. The sensing range of the left front radar 1013 is indicated with 1105. The sensing range of the right rear radar 1015 is indicated with 1102. The sensing range of the left rear radar 1014 is indicated with 1101. The sensing range of the front camera 102 is indicated with 1106. The sensing range of the surrounding camera 1021 is indicated with 1103.

The position of an object around the driver's vehicle and the relative speed are obtained from the front radar 1011, the right front radar 1012, the left front radar 1013, the right rear radar 1015, the left rear radar 1014, and the surrounding camera 1103.

The position of an object in front of the driver's vehicle, the relative speed, the position of a white line on the road, the position of the boundary between the road and another area, the type and position of a traffic sign, and the color and position of a traffic signal are obtained from the front camera 102.

The road shape information that is not obtained from the front camera 102, for example, a radius R and length of a curve in front of the driver's vehicle, the inclination and length of a steep, the increase or decrease in the number of lanes, the road regulation information, the position of an intersection, or the position of a turnpike is obtained from a map ECU 103. The map ECU 103 is connected to a GPS 104 to obtain the current position of the driver's vehicle.

The position and speed of a peripheral object, the position and color of a traffic signal, and the position and type of a traffic sign that are not obtained from the front camera 102 and the radars 1011 to 1015 are obtained from a vehicle-to-vehicle/road-to-vehicle communication ECU 117.

The automatic driving control device (automatic driving ECU) 105 controls the driver's vehicle by controlling an actuator to be described below.

Controlling an engine ECU 110 controls acceleration of the driver's vehicle. Controlling a brake ECU 111 controls deceleration of the driver's vehicle. Controlling a steering ECU 113 controls the direction in which the driver's vehicle travels.

The automatic driving ECU 105 further obtains the conditions of the driver's vehicle and a driving state in which the driver drives the vehicle from sensors to be described below. The opening angle of the throttle valve opened by the driver is obtained from a throttle valve sensor 106. The yaw rate of the driver's vehicle is obtained from a yaw rate sensor 107. The speed of the driver's vehicle is obtained from a vehicle speed sensor 108. The manipulated variable of the steering wheel operated by the driver (the steering angle) is obtained from a steering angle sensor 109.

Figure 2:
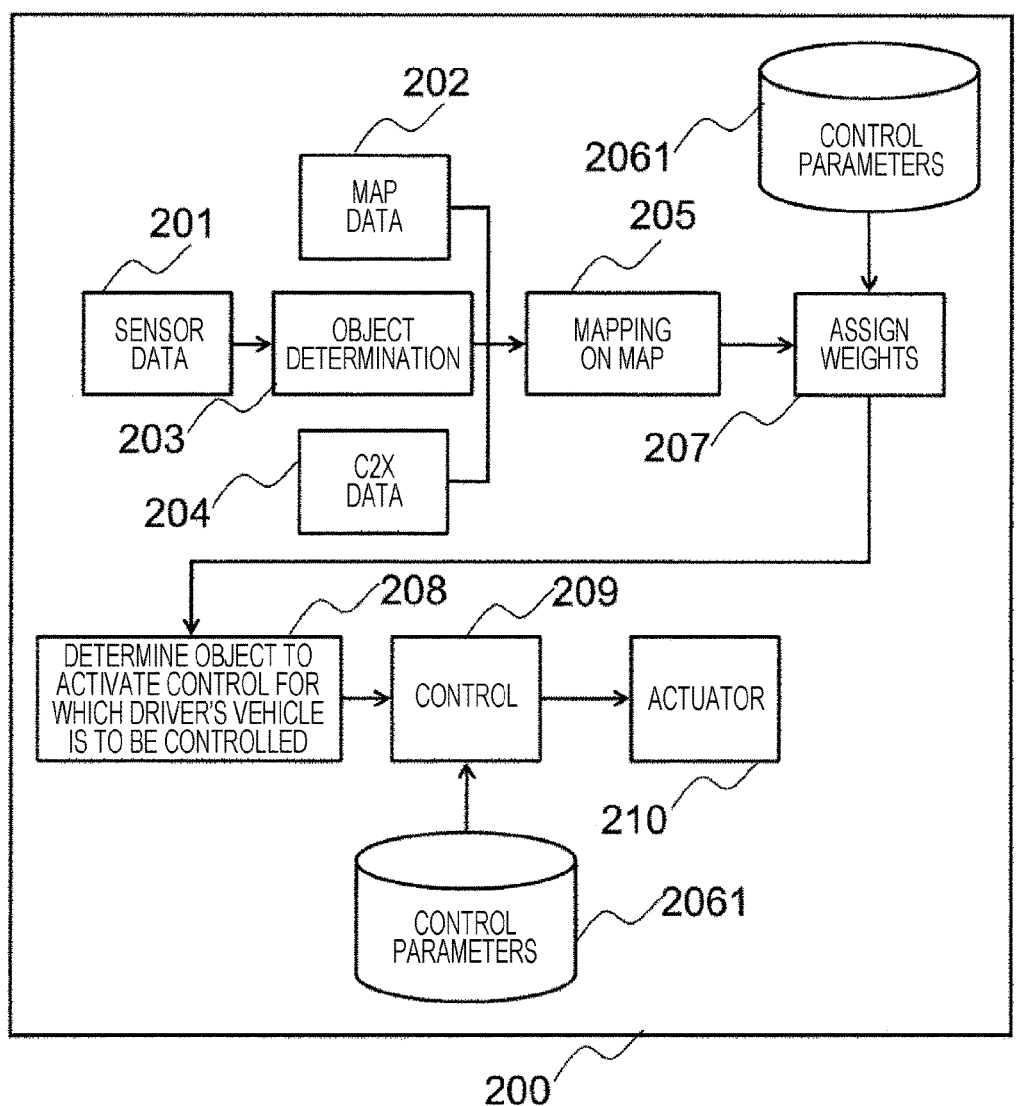
FIG. 2 is a block diagram of the control of automatic driving.

A process performed in the automatic driving ECU 105 in a normal control will be described with reference to FIG. 2. An object determination unit 203 extracts an object for which the driver's vehicle is likely to be controlled from sensor data 201 obtained from the radars 1011 to 1015, the front camera 102, the map ECU 103, and the C2X ECU 117 illustrated in FIG. 1. The sensor data includes the information that is not related to the control of the driver's vehicle so much, such as noise. Thus, the object determination unit 203, for example, removes a pebble-sized object from the objects for which the driver's vehicle is controlled to stop or curve.

Next, the object for which the driver's vehicle is likely to be controlled, which is extracted by the object determination unit 203, and the peripheral object information obtained from the vehicle-to-vehicle/road-to-vehicle communication data 204 are mapped on the map information obtained from the map data 202 in 205.

The weighting unit 207 assigns a weight to the object for which the driver's vehicle is to be controlled, for example, according to the position mapped on the map, the type of the object, and the traveling direction in which the driver's vehicle travels.

Figure 3:
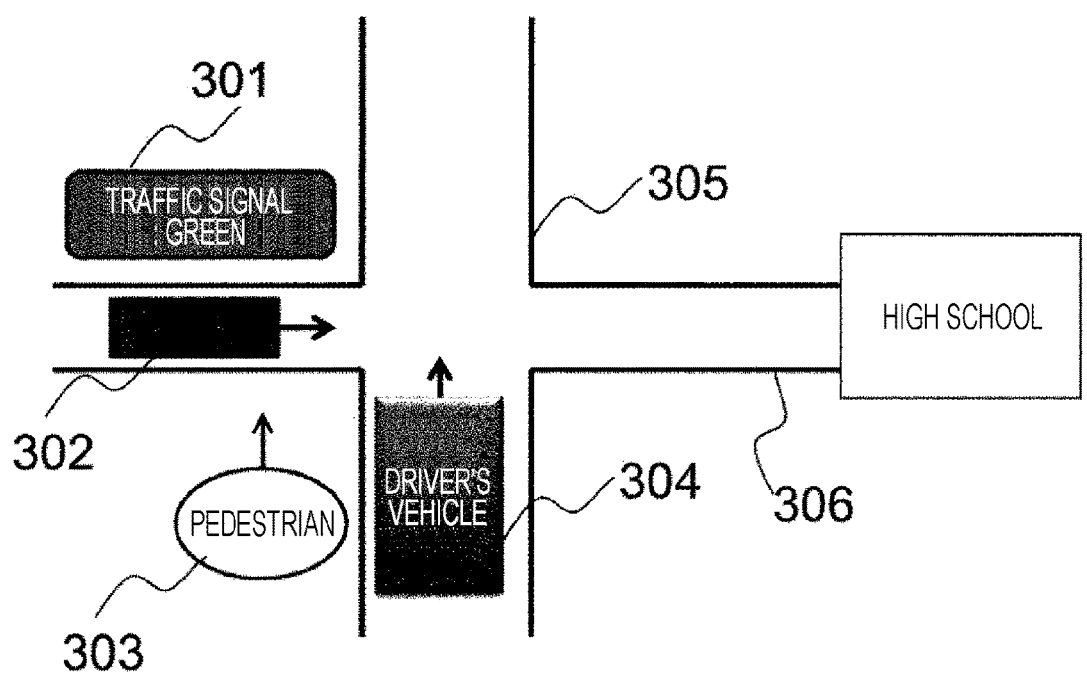
FIG. 3 is a schematic diagram of a road for describing exemplary control according to the present invention.

FIG. 3 illustrates an exemplary operation of the weighting unit 207. There is a traffic signal 301 on a road 305 in the direction in which the driver's vehicle travels and a bicycle 302 approaches the driver's vehicle on a road 306 crossing the road 305. In addition, a pedestrian 303 walks in the same direction as the direction in which the driver's vehicle travels. In such a case, the weight assigned to the traffic signal 301 is the heaviest, the weight assigned to the bicycle 302 is the second heaviest, and the weight assigned to the pedestrian 303 is the lightest.

The weight assigned to each object at each place is set as a parameter in a control parameter 2016. For example, the traffic signal 301 has a weight of 10. The weight of the bicycle 302 entering a crosswalk on a sidewalk is set according a Time-to-collision (TTC) table 1. In this example, the driver's vehicle 304 is controlled according to the traffic signal until the TTC of the bicycle 302 becomes one second.

TABLE 1

| TTC table | | | | |
|---|---|---|---|---|
| TTC | 10 | 3 | 2 | 1 |
| Weight | 5 | 6 | 8 | 11 |

According to the weights assigned by the weighting unit 207, an object for which the driver's vehicle is to be controlled determination unit 208 determines an object for which the driver's vehicle is to be controlled. A control unit 209 calculates a control quantity relative to the object for which the driver's vehicle is to be controlled, which the object for which the driver's vehicle is to be controlled determination unit 208 determines as described above, in order to control the actuator 210.

The control unit 209 determines the distance to the object for which the driver's vehicle is to be controlled, the speed of the driver's vehicle, the acceleration and deceleration of the driver's vehicle. Such control quantities are determined according to the control parameter 2016.

Figure 4:
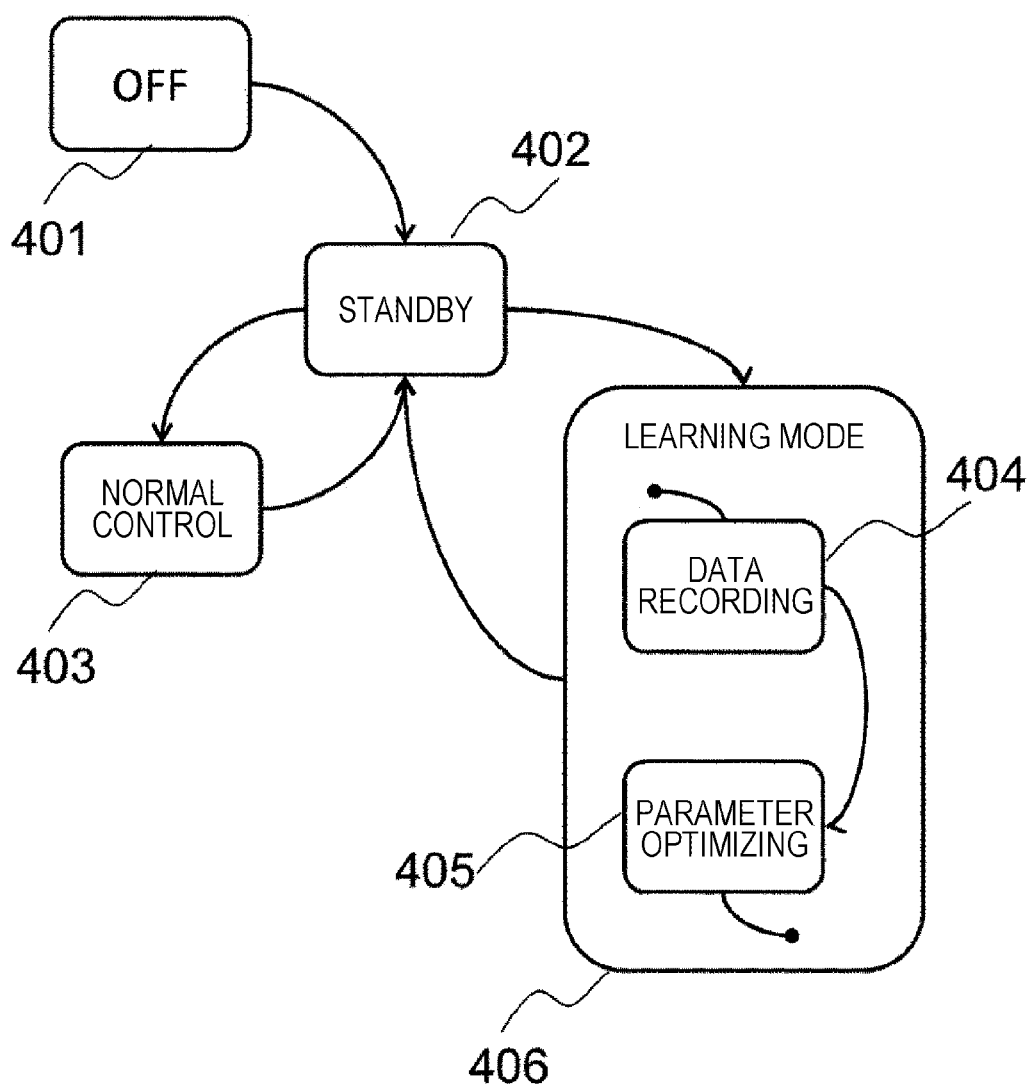
FIG. 4 is a diagram illustrating transition from a normal automatic control mode to a learning mode.

The process performed in the normal control has been described. The modes other than the normal control will be described with reference to FIG. 4.

There are an OFF mode 401 in which the device does not control the driver's vehicle, a standby mode 402 for waiting the start of control, a normal control mode 403, and a learning mode 406 of the device according to the present invention.

The OFF mode 401 is a state in which the driver drives the vehicle and the automatic driving is not performed. The standby mode 402 is a state in which the driver drives the vehicle similarly to 401. At the same time, the standby mode 402 is also a state in which the fact that automatic driving control is kept on standby is displayed on a display device such as a meter and, once the driver operates, for example, a switch SW, the device can be shifted to the normal control 403 or the learning mode 406. The OFF mode 401 and the standby mode 402 are provided as described above in order to prevent an error in the driver's switch operation or the like to suddenly shift the device to the normal control 403.

The learning mode 406 includes a data recording mode 404 and a parameter optimizing mode 405. These modes will be described with reference to FIGS. 5 and 6.

Figure 5:
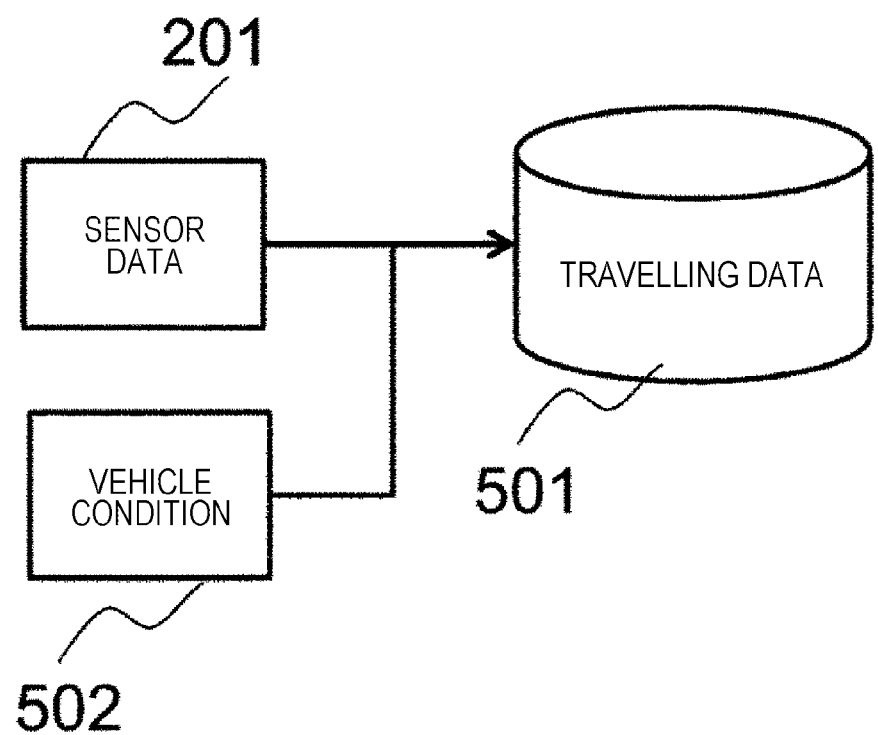
FIG. 5 is a data flow diagram while a driver drives a vehicle.

In the data recording mode 404, all of the sensor data 201 and the vehicle condition information 502 are recorded on a data recording medium 501 as illustrated in FIG. 5.

The vehicle condition 502 is the information obtained, for example, from the throttle valve sensor 106, the yaw rate sensor 107, the vehicle speed sensor 108, and the steering angle sensor 109. A sensor information item about the inside of the driver's vehicle may also be recorded as the vehicle condition 502.

The data recording mode 404 are maintained from the time the driver requests the transition from the standby mode 402 to the learning mode 406 to the time the driver requests the termination of the learning mode 406.

For example, in order to perform the learning of control on the road of the driver's commute route, the driver needs to shift the mode to the learning mode 406 at the garage of the driver's house and terminate the learning mode 406 at the parking lot of the driver's office.

Figure 6:
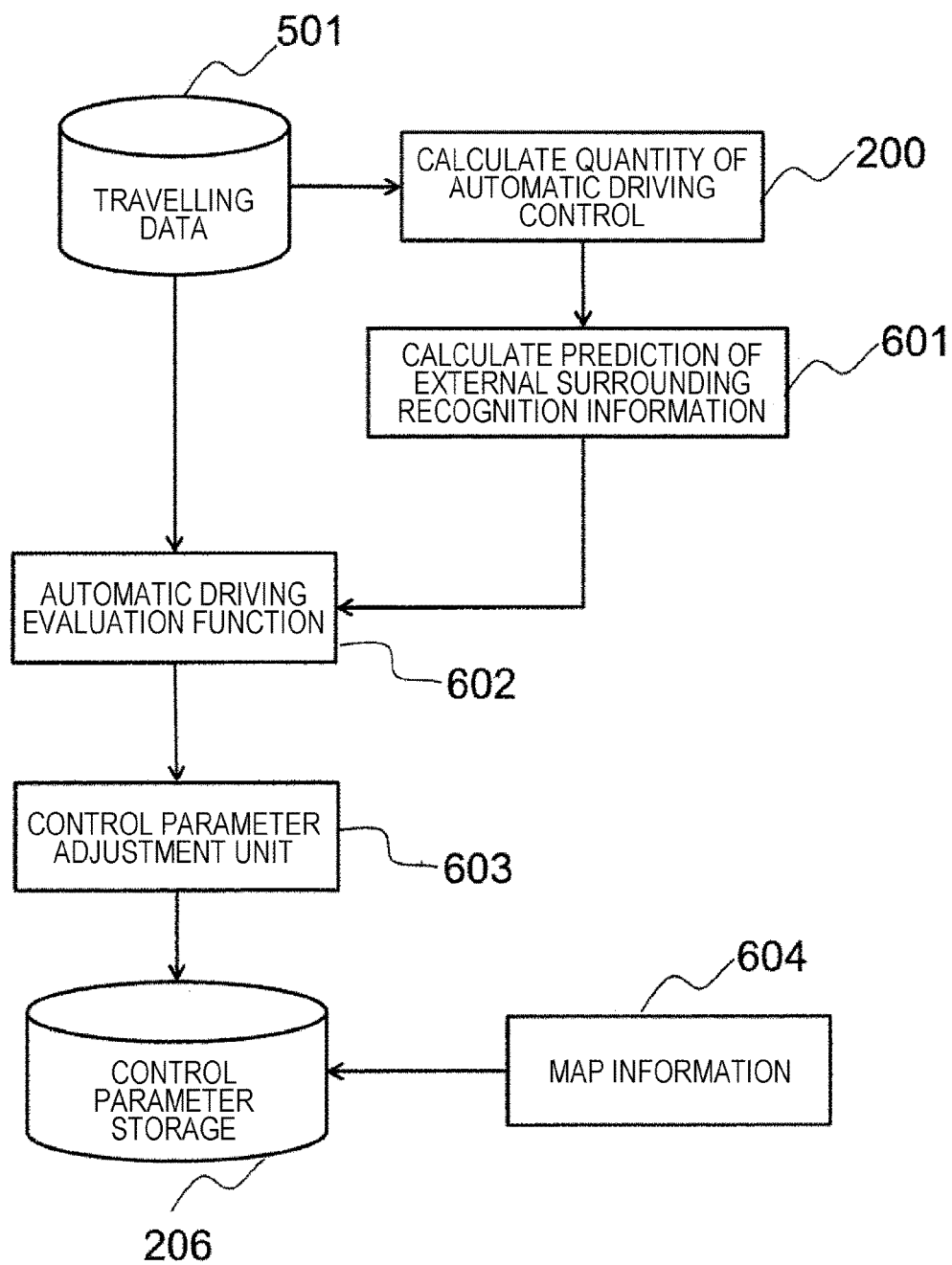
FIG. 6 is a flowchart of a process for evaluating an automatic driving parameter.

The process performed in the parameter optimizing mode 405 will be described next with reference to FIG. 6.

Here, the traveling data 501 recorded while the driver drives the vehicle is compared with prediction data that predicts the traveling data when automatic driving is performed in the same conditions and the control parameters are set so that the comparison result is lower than or equal to a threshold. A specific setting process will be described below.

Figure 7:
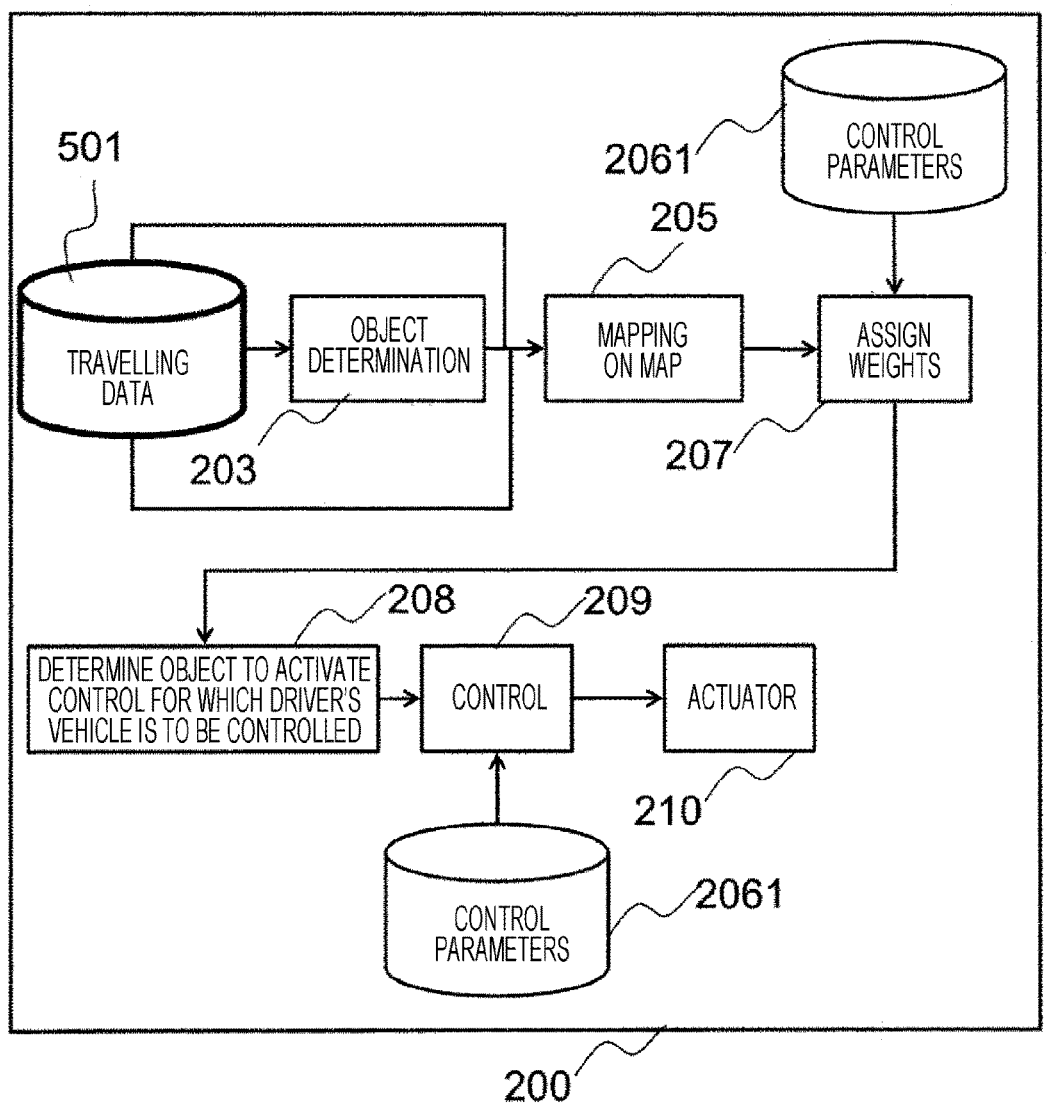
FIG. 7 is a block diagram of control for using the data when the driver drives the vehicle.

The data recorded on the data recording medium 501 in the data recording mode 404 is input into an automatic driving control quantity calculation unit 200 and used to calculate the automatic driving control quantity when automatic driving is performed under the same conditions as the conditions under which the driver drives the vehicle. The automatic driving control quantity calculation unit 200 calculates the quantity of control during the automatic driving. As illustrated in FIG. 7, the traveling data 501 is used for the calculation instead of the sensor data 201, the map data 202, and the C2X data 203 illustrated in FIG. 2.

Next, an external surrounding recognition information prediction calculation unit 601 calculates the predicted traveling data when automatic driving is performed according to the control quantity calculated by the automatic driving control quantity calculation unit 200.

Figure 8:
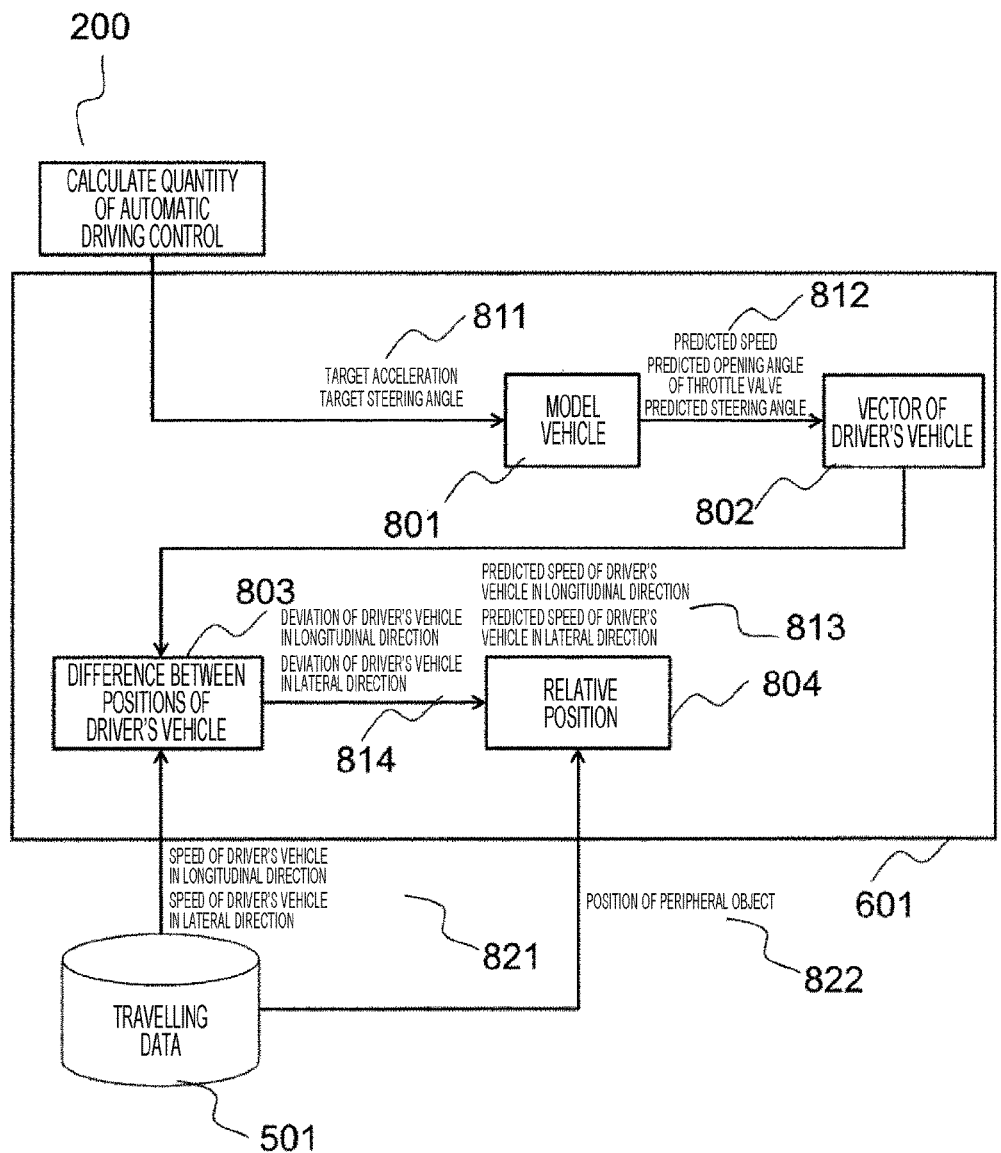
FIG. 8 is a flowchart of a process for calculating the position of the driver's vehicle when the driving is automated according to the data when the driver drives the vehicle.

A method for calculating the predicted traveling data will be described with reference to FIG. 8.

The control quantity from the automatic driving control quantity calculation unit 200, and target acceleration and target steering angle 811 are input to a model vehicle 801 so that predicted speed, predicted steering angle, and predicted opening angle of the throttle valve 812 are calculated. The model vehicle 801 includes a dead time and a first-order time delay coefficient with respect to the control quantity. A mechanism to make the vehicle respond to a target physical quantity, such as the opening angle of the throttle valve is determined, for example, according to the map. For example, the predicted speed is calculated by integrating a value that is the target acceleration added to the dead time and the first-order time delay, and adding the integrated value to a default speed. Similarly, the predicted steering angle is obtained by adding the dead time and first-order time delay to the target steering angle. The predicted opening angle of the throttle valve is obtained by subtracting the map of opening angle of the throttle valve from the target acceleration and the corresponding gear ratio.

Next, a vehicle vector calculation unit 802 calculates driver's vehicle speeds in a longitudinal direction and a lateral direction 813 according to the predicted speed and predicted steering angle. A traveling angle θ of the traveling direction in which the driver's vehicle travels is calculated from the predicted steering angle. From this calculation, the driver's vehicle speed in a longitudinal direction=the predicted speed×sin θ and the driver's vehicle speed in a lateral direction=the predicted speed×cos θ can be found.

Next, a vehicle position difference calculation unit 803 calculates: the difference between the predicted position that is the value of integral of the driver's vehicle speeds in a longitudinal direction and a lateral direction 813 and the position that is the value of integral of the driver's vehicle speeds in a longitudinal direction and a lateral direction 821 provided from the traveling data 501; and deviations of the driver's vehicle in a longitudinal direction and a lateral direction 814.

Next, a relative position calculation unit 804 calculates the relative positions of a peripheral object to the driver's vehicle in a longitudinal direction and a lateral direction when the driving is automated from the deviations of the driver's vehicle in a longitudinal direction and a lateral direction 814 and the position of the peripheral object 822 provided from the traveling data 501.

Figure 9:
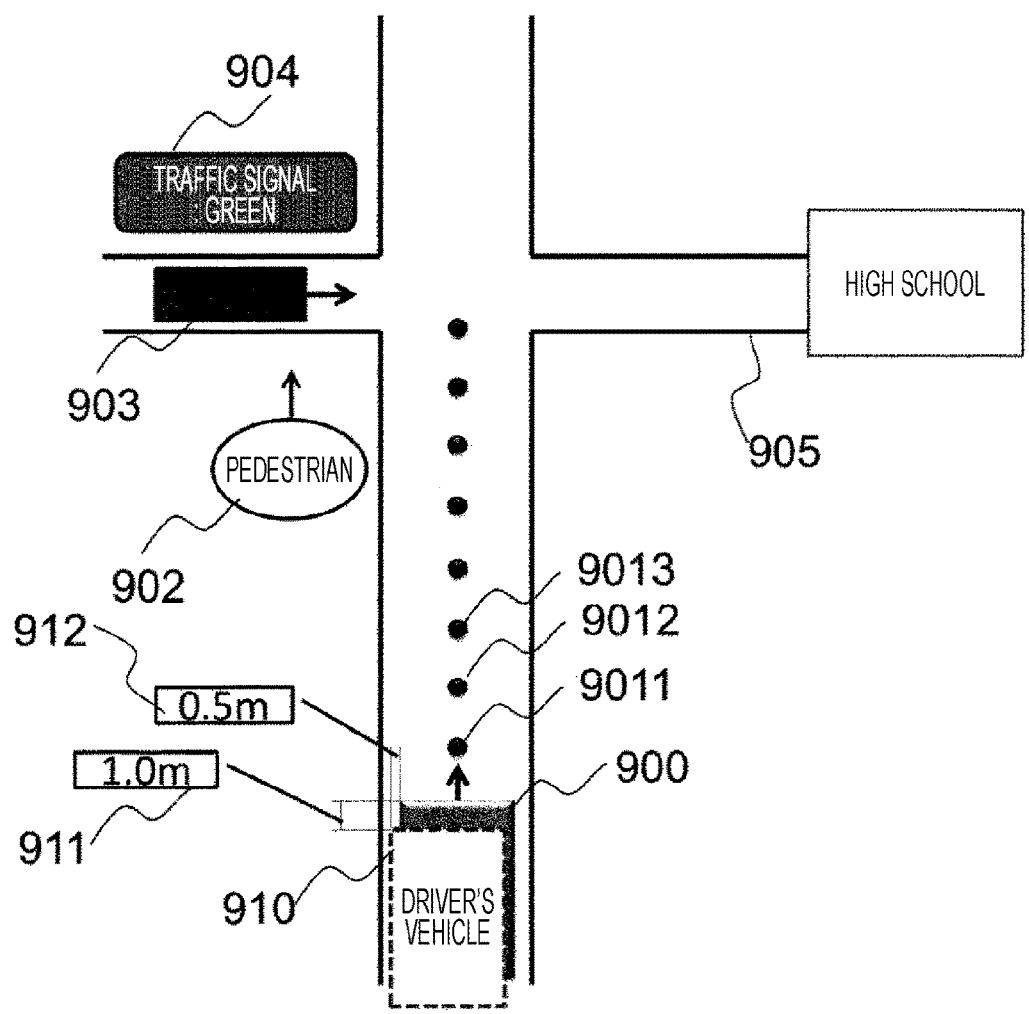
FIG. 9 is a diagram for describing a resetting point on a map.

The relative positions of a peripheral object to the driver's vehicle in a longitudinal direction and a lateral direction are the position of the peripheral object with respect to the driver's vehicle. For example, when a position 910 of the driver's vehicle when the driving is automated is different from a position 900 of the driver's vehicle when the driver drives the vehicle by +0.5 m in a lateral direction 912 and −1.0 m in a longitudinal direction 911 as illustrated in FIG. 9, the relative positions of peripheral objects 902 to 904 are slid by +0.5 m in a lateral direction and −1.0 m in a longitudinal direction. The slid positions are set as the relative positions in a lateral direction and in a longitudinal direction. The external surrounding recognition information prediction calculation unit 601 performs such processes.

The value of integral of the driver's vehicle speeds in a longitudinal direction and a lateral direction 821, which is used to find the difference between the positions of the driver's vehicle, is reset when the position of the driver's vehicle on the map recorded on the traveling data 501 reaches a certain point. For example, when the traveling data illustrated in FIG. 9 is recorded as the traveling data 501, the value of integral is reset every time the driver's vehicle 900 reaches a point 901 on the map. The positions of the peripheral objects 902 to 905 taken from the traveling data 501 are also reset and changed to the positions in the traveling data 901 when the driver's vehicle in the traveling data 501 reaches a point 901 on the map. In other words, when the driver's vehicle in the traveling data 501 reaches a point 901 on the map, both of the position of the driver's vehicle and the positions of the peripheral objects are reset and changed to the same positions as the positions when the driver drives the vehicle. Without such resetting, for example, the vehicle fails to recognize the pedestrian 902 illustrated in FIG. 9 when the driving is automated. An objective of the process is not to find an accurate position of the driver's vehicle when the driving is automated, but to determine the control parameters mainly with respect to the driver's vehicle and the peripheral objects with reference to the relative positions when the driver drives the vehicle. Thus, such resetting is performed.

Next, an automatic driving evaluation function 603 will be described. An exemplary evaluation function 603 will be shown as an equation 1. In this equation, the J is an evaluation result of the evaluation function. The smaller the value of J is, the better. The intervals to be integrated are shown as is to that are the time when the driver's vehicle reaches a point 9011 at which resetting in FIG. 9 is performed and the time when the driver's vehicle reaches a point 9012 at which the next resetting is performed. The $w_n$ is a weight to be assigned to a variable to be evaluated. The weight is previously set for each variable. The weight may be used as a control parameter and be changed with the evaluation result by the evaluation function. The $v_d$ is the speed at which the driver drives the vehicle and obtained from the traveling data 501. The $v_a$ is a predicted speed of the driver's vehicle when the driving is automated and obtained from the external surrounding recognition information prediction calculation unit 601. Similarly, the $d_{yd}$ is the longitudinal distance between the driver's vehicle and a peripheral object when the driver drives the vehicle and obtained from the traveling data 501. The $d_{ya}$ is the predicted longitudinal distance between the driver's vehicle and a peripheral object when the driving is automated and obtained from the external surrounding recognition information prediction calculation unit 601. Each subtraction such as $(V_d-V_a)$ is squared. This prevents the result of comparison of the data when the driver drives the vehicle with the data when the driving is automated to have a negative value, and correctly integrates the difference between the data when the driver drives the vehicle and the data when the driving is automated. As described above, the differences in all or a part of the data obtained when the driver drives the vehicle and the data obtained when the driving is automated are integrated. Then, the driving by the driver and the automatic driving are compared. Not only the obtained data but also the differentiated values may be used for the comparison. For example, the vehicle speeds are differentiated so that the accelerations can be compared.

[Expression 1]

$$J=\int_{te}^{ts} w_1(v_d-v_a)^2 + w_2(d_d-d_a)^2 \ldots dx \quad \text{Equation 1:}$$

Figure 10:
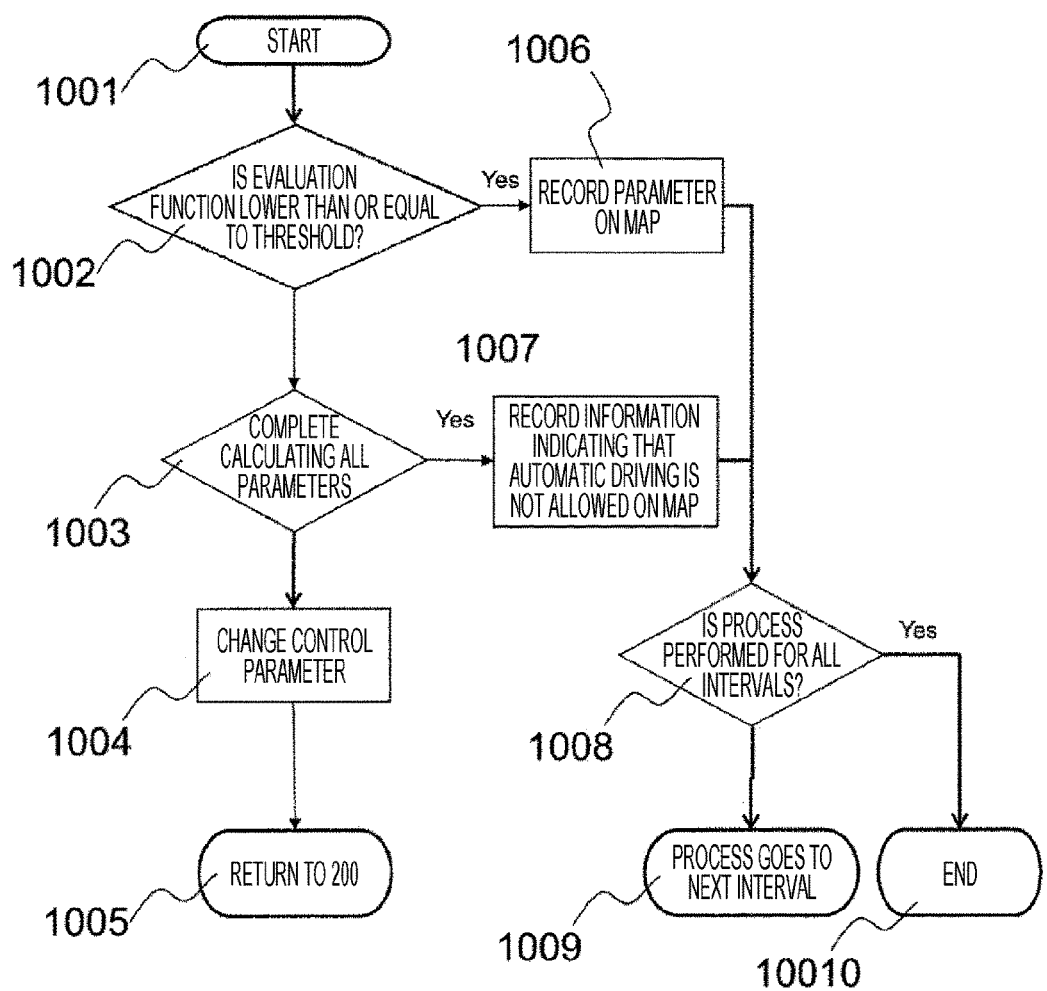
FIG. 10 is a flowchart of a process for learning the driver's driving.

Next, a control parameter adjustment unit 603 will be described with reference to FIG. 10.

First, the control parameter adjustment unit 603 determines in 1002 whether the result of the evaluation with the evaluation function is lower than or equal to a threshold. If the result is lower than or equal to the threshold, the control parameter adjustment unit 603 records the parameter on the map in 1006. The "recording on the map" means that the control parameters, which are used when control is performed between the points at which the resetting in FIG. 9 is performed such as the points 9011, 9012, and 9013, are associated with the positions of the driver's vehicle on the map and recorded on the map so that the parameters can be used when the driver's vehicle reaches an interval between the points. For example, a parameter is calculated according to the traveling data 501 obtained between the resetting points 9011 and 9012 in FIG. 9. The calculation result is evaluated with the evaluation function equation 1. If the evaluation result is lower than or equal to the threshold, the driver's vehicle is controlled with the parameter between the time when the driver's vehicle reaches the resetting point 9011 in an upward direction of FIG. 9 and the time when the driver's vehicle reaches the resetting point 9012 while the driving is automated.

The parameters recorded on the map may be recorded, for example, on a server installed outside the driver's vehicle and used for controlling another vehicle. Using the parameters recorded on such a server enables the driver's vehicle to be automated with reference to the operation of another vehicle even on a road through which the driver has not passed before.

If the evaluation result is not lower than or equal to the threshold in 1002, the control parameter adjustment unit 603 determines in 1003 whether the evaluations of all the parameters are completed. If the evaluations of all the parameters are completed, this means that the parameters are not properly set. Thus, the information indicating that automatic driving control is not allowed is recorded on the map in 1007. When automatic driving is performed and the vehicle reaches the interval where the information indicating that automatic driving control is not allowed is recorded, the control parameter adjustment unit 603 notifies the driver of the fact that automatic driving control is not allowed and cancels the automatic driving control.

If the control parameter adjustment unit 603 determines in 1003 that the evaluations of all the parameters are not completed, the control parameter adjustment unit 603 newly sets the other parameter in 1004 and returns to the automatic driving control quantity calculation 200. Then, the automatic driving control quantity calculation 200 and the external surrounding recognition information prediction calculation 601 are repeated with the newly set parameter. Then, the control parameter adjustment unit 603 determines whether the evaluation result of the evaluation function equation 1 is lower than or equal to the threshold.

After the parameter is recorded on the map in 1006, or after the information indicating that the automatic driving control is not allowed is recorded on the map in 1007, it is determined whether the intervals between all the resetting points in the traveling data 501 are processed. If all the intervals are not processed, the process goes to the next interval in 1009. If all the intervals are processed, the process is terminated in 10010.

As described above, the parameters are changed and evaluated at the intervals between all the resetting points in the traveling data 501. This optimizes the control parameters.

REFERENCE SIGNS LIST 1011 front radar
1012 right front radar
1013 left front radar
1015 right rear radar
1014 left rear radar
102 front camera
1021 surrounding camera
105 automatic driving control device
501 data recording medium (learning recording device)
602 automatic driving evaluation function (output comparison device)
603 control parameter adjustment unit (control parameter setting unit)

The invention claimed is:

1. An automatic driving control device that controls an actuator of a vehicle in order to cause the vehicle to automatically travel according to an external surrounding recognition sensor that recognizes external surroundings and information from the external surrounding recognition sensor without driver operation, the automatic driving control device comprising:
    a learning recording device that records external surrounding recognition information and vehicle condition information when the driver drives the vehicle;
    an output comparison device that compares a result of a process in which the automatic driving control device processes the information recorded in the recording device with the information recorded in the learning recording device; and
    a control parameter setting device that sets a control parameter so that the result compared by the output comparison device approaches driving of the driver,
    wherein the control parameter that is set by the control parameter setting device is associated with a position of the vehicle on a map, and
    wherein a value of an integral of a speed of the vehicle in a longitudinal direction and a speed of the vehicle in a lateral direction is reset when the position of the vehicle on the map reaches a predetermined point on the map.

2. The automatic driving control device according to claim 1, wherein the control parameter set on the map is read again from the map and control is performed.

3. An automatic driving control device, comprising:
    an external surrounding recognition sensor that recognizes external surroundings;
    a learning recording device that records external surrounding recognition information and vehicle condition information when a driver drives a vehicle; and
    an output comparison device that compares a result of a process in which the automatic driving control device processes the information recorded in the recording device with the information recorded in the learning recording device,
    wherein the automatic driving control device controls an actuator of the vehicle in order to cause the vehicle to automatically travel according to information from the external surrounding recognition sensor without driver operation, and
    changes a weight assigned to a recognized object which is recognized by the external surrounding recognition sensor of the vehicle so that the result compared by the output comparison device approaches driving of the driver,
    wherein the weight assigned to the recognized object is recorded as a control parameter on a map and is associated with a position of the vehicle on the map, and
    wherein a value of an integral of a speed of the vehicle in a longitudinal direction and a speed of the vehicle in a lateral direction is reset when the position of the vehicle on the map reaches a predetermined point on the map.

4. An automatic driving control device, comprising:
    an external surrounding recognition sensor that recognizes external surroundings;
    a learning recording device that records external surrounding recognition information and vehicle condition information when a driver drives a vehicle; and
    an output comparison device that compares a result of a process in which the automatic driving control device processes the information recorded in the recording device with the information recorded in the learning recording device,
    wherein the automatic driving control device controls an actuator of the vehicle in order to cause the vehicle to automatically travel according to information from the external surrounding recognition sensor without driver operation,
    wherein a control parameter is associated with a position of the vehicle on a map, and
    wherein a value of an integral of a speed of the vehicle in a longitudinal direction and a speed of the vehicle in a lateral direction is reset when the position of the vehicle on the map reaches a predetermined point on the map.

* * * * *